Dec. 23, 1941.  G. S. BAYS ET AL  2,266,733
HIGH PRESSURE CONSISTOMETER
Filed Nov. 21, 1939    3 Sheets-Sheet 1

Inventors:
George S. Bays
Joseph B. Clark
Clarence H. Seeley
By
Attorney.

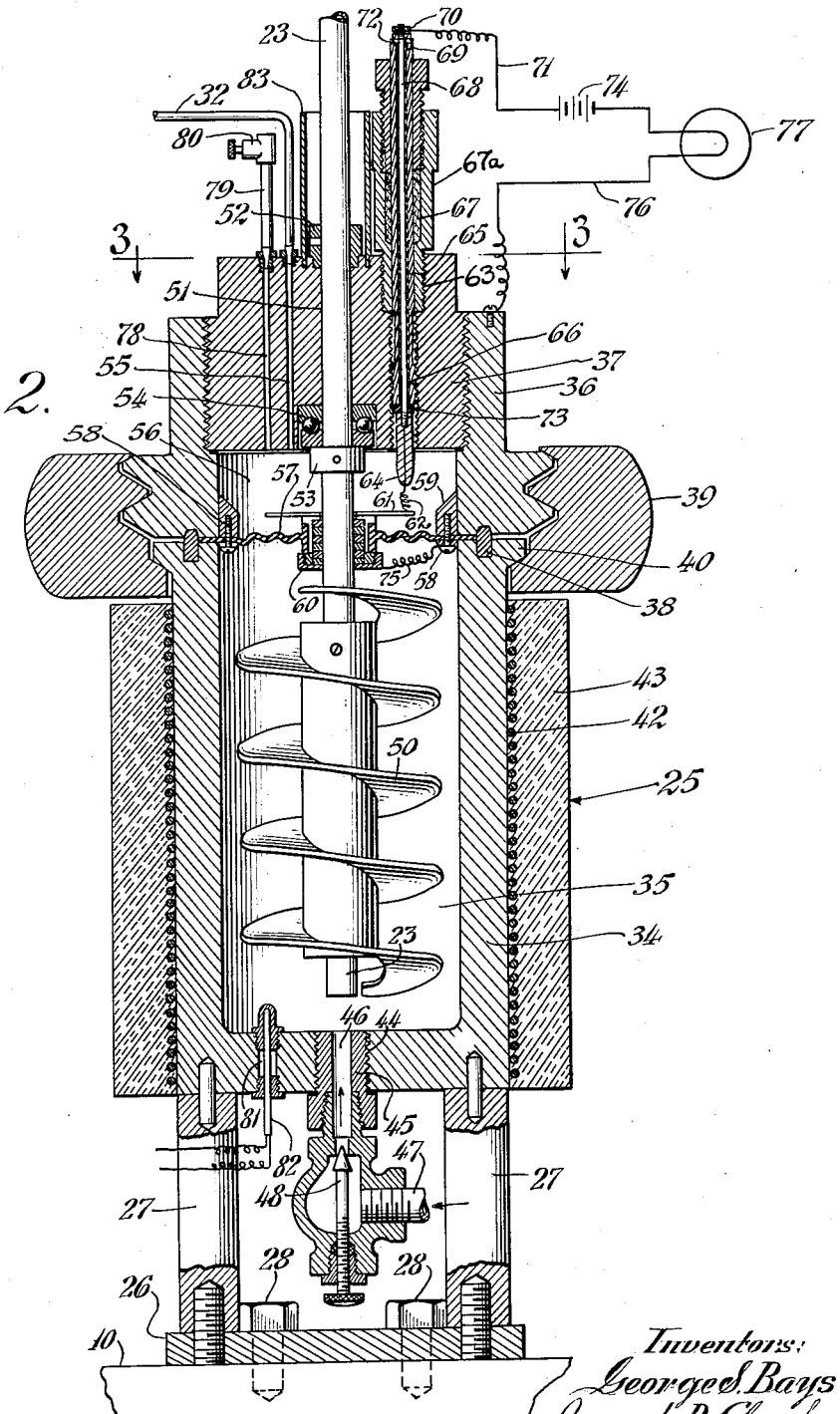

Patented Dec. 23, 1941

2,266,733

UNITED STATES PATENT OFFICE 2,266,733

HIGH PRESSURE CONSISTOMETER

George S. Bays and Joseph Baldwin Clark, Tulsa, Okla., assignors to Stanolind Oil and Gas Company, Tulsa, Okla., a corporation of Delaware Application November 21, 1939, Serial No. 305,510

6 Claims. (Cl. 265—11)

This invention relates to apparatus for measuring the consistency of fluids, and more specifically to consistometers adapted to be operated at high pressures and temperatures. While our invention is not so limited, it is particularly adapted to be used in testing the properties of various fluid materials commonly used in oil and gas wells at pressures and temperatures corresponding to those existing in such wells.

Among the major factors influencing the successful completion of oil wells is the problem of efficiently placing the cement which acts to support the various strings of casing used and to seal off the overlying earth formations from those which contain the oil or gas being sought. Considerable difficulty has been encountered in the process of placing cement, because the material commonly used, that is Portland cement, tends to thicken and harden in a relatively short period of time, typically four hours. In the deeper wells and higher temperature cementing jobs, this problem is much more serious than when cementing shallow wells.

There are now on the market a number of cements which are similar to ordinary Portland cements, but which require a somewhat longer time to reach the stage of thickening and hardening. This end is achieved by various manufacturers of cements in different ways, and at ordinary temperatures and atmospheric pressure, the claimed delayed time of setting is readily demonstrated by experiment.

Such tests cannot be said to demonstrate the properties of cements under the condition existing in wells, however, and they are particularly unreliable for indicating the behavior of cements under the pressures and temperatures encountered in deep wells, which usually range from 1000 to 3000 pounds per square inch and from 125° to 225° F., although even more severe conditions are not uncommon. In fact we have found that atmospheric pressure tests are not truly indicative of the properties of cements under actual condition of use by comparing them with data obtained at high pressures by means of the embodiment of the present invention hereinbelow described.

Our invention is also useful for studying the variations in viscosity of oil well drilling muds. There are numerous chemicals available which will reduce the viscosity of drilling muds when observed under atmospheric pressure, and consistometers embodying our invention are adapted for studying the effect of these chemicals at high pressures to determine their true value under the conditions of use.

It is, therefore, an object of our invention to provide apparatus for measuring the consistency of fluids at high pressures. Another object is to provide an improved consistometer which is particularly suitable for determining the changes in consistency of fluids under high pressures and at elevated temperatures. A further object is to provide apparatus for studying the viscous properties of fluids for use in oil and gas wells under bottom hole conditions. A further object of our invention is to provide apparatus for agitating non-lubricating fluids at high pressures, and, if desired, at elevated temperatures. Further objects and advantages of our invention will be apparent from the following detailed description read in conjunction with the drawings, in which:

Figure 2 is a vertical cross-section through the pressure chamber which holds the material under test;

The measurement of the consistency of a fluid sample according to our invention utilizes the known principle of determining the power input to a motor driving a stirring mechanism at constant speed. However, the application of this principle to such measurements at very high pressures, 1000 to 3000 pounds per square inch for example, has involved such mechanical and other difficulties that no apparatus of this type has been available heretofore. We have found that these difficulties can be overcome and accurate results obtained by eliminating the usual packing gland and using a low friction seal around the shaft of the stirring mechanism whereby the internal pressure is confined to the container, this pressure being applied by forcing a fluid, such as lubricating oil, into the container. This fluid is kept from contact with the test sample by supplying the container with a flexible diaphragm supplied with a packed gland enclosing the shaft of the stirring mechanism. In this way the power utilized in stirring the sample can be measured without excessive packing gland friction, any high pressure fluid leaking around the shaft being harmless since the supply thereof is constantly maintained. This and other features of our invention can best be understood from the detailed description of a specific embodiment thereof, the operation of which will be given with particular reference to the testing of a cement slurry.

Figure 1:
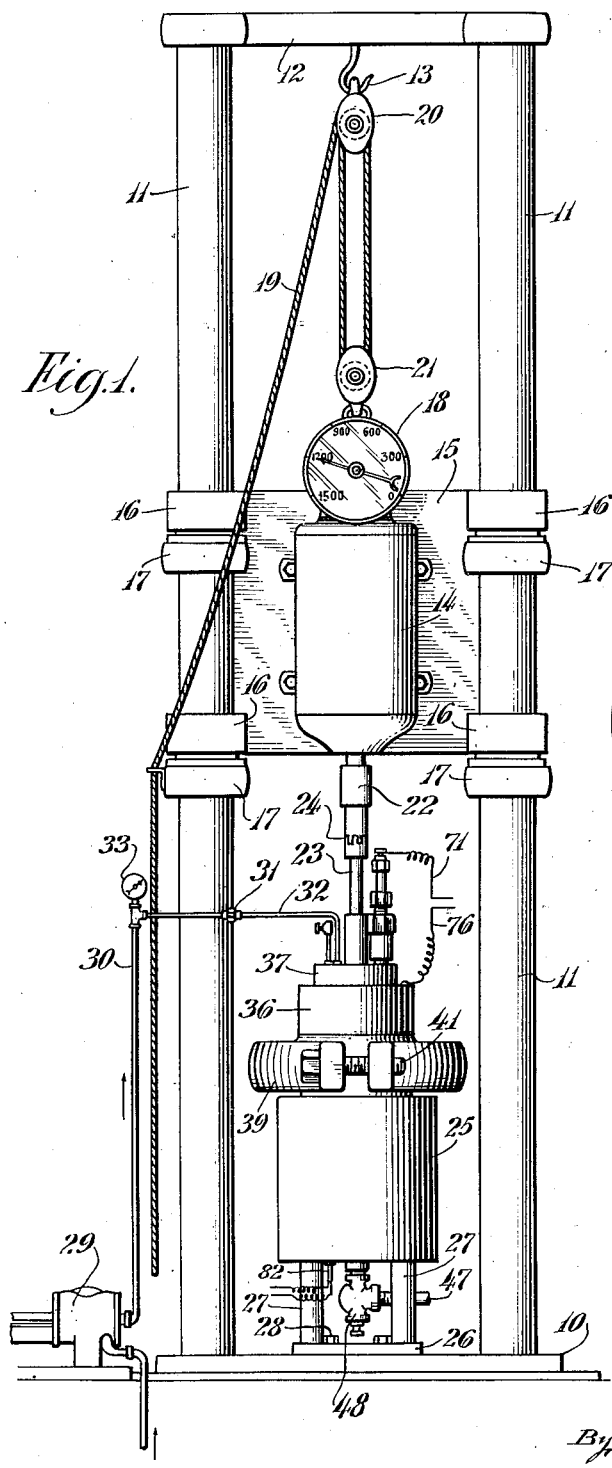
Figure 1 is an elevation of a consistometer according to our invention excluding the electrical control and power measuring system.
Figure 3:
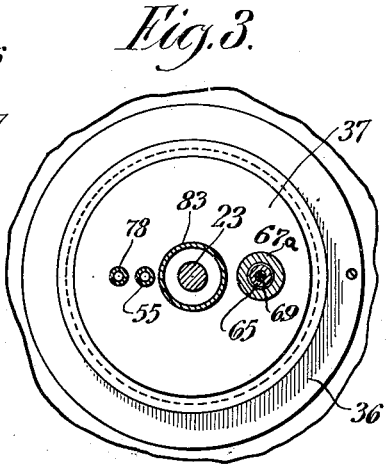
Figure 3 is a horizontal section taken along line 3—3 of Figure 2.

Referring now to Figure 1, base plate 10 is affixed to the lower ends of vertical supports 11 which have a horizontal member 12 between their upper ends carrying a depending hook 13. Motor 14, which is preferably of the direct current shunt wound type, equipped with an integral speed reducing system, is carried by plate 15 so that its driving shaft is in a vertical position and plate 15 in turn is slidably mounted on supports 11 by means of collars 16. Fixed collars 17 on supports 11 are stops to limit the vertical motion that can be imparted to motor 14 and plate 15. Immediately above motor 14 and firmly attached thereto is tachometer 18 which is adapted to indicate the speed of the motor in revolutions per minute. Motor 14, tachometer 18 and their mountings are arranged to be raised and lowered at will by means of cable 19 traveling over blocks 20 and 21, stationary block 20 being supported by hook 13. Driving shaft 22 is detachably coupled to consistometer shaft 23 by means of coupling 24, which is preferably of a type whereby shafts 22 and 23 are disconnected merely by raising motor 14.

Pressure vessel 25 contains the sample under test and this will be completely described in connection with Figure 2, which shows its construction in detail. For the present it will be sufficient to say that vessel 25 is supported upon plate 26 by means of supports 27, plate 26 being affixed to base plate 10 with cap screws 28. As brought out above, a source of high pressure fluid is required and this is supplied through pump 29, line 30, coupling 31 and line 32, the pressure of the fluid and therefore that of the sample being read by means of gauge 33.

Turning now to Figure 2, pressure vessel 25 consists essentially of a body portion 34 having a sample-receiving chamber 35 therein held in position by supports 27, and a composite closure consisting of a nipple 36, the lower portion of which is externally threaded and the upper portion of which is internally threaded, and a plug 37 which is screwed into the last-mentioned threads. All of these members are capable of withstanding very high pressures and the seal between nipple 36 and body 34 is obtained by means of gasket 38 and split ring 39, which has internal threads, preferably of rather large pitch, cooperating with the external threads of nipple 36 and shoulders 40 formed on the upper part of body 34. The diameter of ring 39 can be quickly changed by means of cap screw 41 (Figure 1), so that the closure with the various elements attached thereto can be quickly attached to and removed from body 34. Chamber 35 is electrically heated by means of resistance wire 42 wound around body 34 and insulation 43 is provided to minimize heat losses.

Body 34 also has an axial threaded opening 44 having a special bushing 45 therein which is provided with a passage 46 in communication with chamber 35. Passage 46, which is used for the admission or withdrawal of a part of the sample to be tested, communicates with conduit 47 and flow therethrough can be controlled by needle valve 48. Recessed into body 34 is a thermometer well 81 carrying a resistance thermometer 82.

Shaft 23 bears a stirring mechanism 50 adapted to cause thorough agitation of the sample in chamber 35. As shown, stirrer 50 is of the screw type, but others such as the perforated plate type, can be used and may be preferable for heavy cement slurries. Shaft 23 is rotatably mounted with a relatively close fit in a suitable axial opening 51 through plug 37 and is kept from longitudinal movement with respect thereto by collars 52 and 53, the latter having thrust ball bearing 54 interposed between it and plug 37. In this way stirrer 50 is removed from chamber 35 whenever nipple 36 is uncoupled from body 34 and lifted to expose chamber 35. The reason for having bearing 54 mounted adjacent the lower portion of plug 37 rather than the upper portion is that in operation the pressure differential between the chamber 35 and the atmosphere causes an upward thrust greater than the weight of stirrer 50 and shaft 23.

In order to prevent contact between the test sample in chamber 35 and the pressure fluid supplied through line 32 and bore 55 into the interior portion 56 of nipple 36, a flexible corrugated diaphragm 57 made of a suitable material, such as a synthetic oil-resistant rubber substitute, is affixed at its periphery to nipple 36 by means of a plurality of screws 58 and steel ring 59 permanently attached to nipple 36 by welding or other means. Located in the center of diaphragm 57 and surrounding shaft 23 is a packing gland 60, which does not exert any appreciable amount of friction on shaft 23, since there is virtually no pressure differential across it in operation.

It is often desirable to know the location of packing gland 60 and an electric level locator is provided which consists of horizontal metal disc 61 mounted on the top of gland 60, which is adapted to make contact with the lower end of a conductor 62 depending from an elongated tip member 64 which is of metal and which is attached to the lower end of a metal rod 68 by means of threads. Immediately surrounding rod 68 is a tubular insulator 69, and a metal sheath 65 having threads 66 at its lower end cooperating with the threads in the tapped hole 63 in plug 37. By means of insulating discs 72 and 73 and by reason of the fact that tip 64 is of materially smaller diameter than tapped hole 63, it will be seen that an electrical circuit is provided between conductor 62 and nut 70 which is completely insulated from plug 37 and nipple 36. Leakage of pressure fluid through this arrangement is prevented by having nut 70 tight enough so that discs 72 and 73 seal the opening through sheath 65 effectively, and by the provision of a stuffing box 67 being in threaded engagement with metal shell 67a surrounding it, which in turn is threaded to plug 37 and sealing the passage outside of sheath 65.

When disc 61 and conductor 62 are in contact, an electrical current from battery 74 flows through a conductor 71, rod 68, tip 64, conductor 62, disc 61, the metallic portion of packing gland 60, conductor 75, one of the screws 58, ring 59, nipple 36 and conductor 76 back to battery 74. Obviously some indication of current flow must be included in the circuit and this can suitably be a pilot light 77. In order to change the elevation of the end of conductor 62, it is only necessary to rotate sheath 65, for instance by means of a wrench acting on flats filed or otherwise formed on the upper portion of sheath 65 protruding above stuffing box 67 so that threads 66 acting in tapped hole 63 cause sheath 65, and hence tip 64 and conductor 62, to be raised or lowered. By rotating sheath 65 as described above until contact is just made between disc 61 and conductor 62, studies can be made of the shrinkage or expansion of the sample of cement slurry or other material while under test. The exact position of packing gland 60 can, of course, be calculated from the distance between the top of sheath 65 and of plug 37, since the dimensions of all of the parts of the apparatus are known.

Plug 37 is also provided with bore 78 communicating with line 79 and valve 80 for releasing air from chamber 56. Finally, a cylinder 83 attached to the outside of plug 37 and surrounding shaft 23 and collar 52 is provided to hold the fluid which leaks around shaft 23 from chamber 56 during operation.

Figure 4:
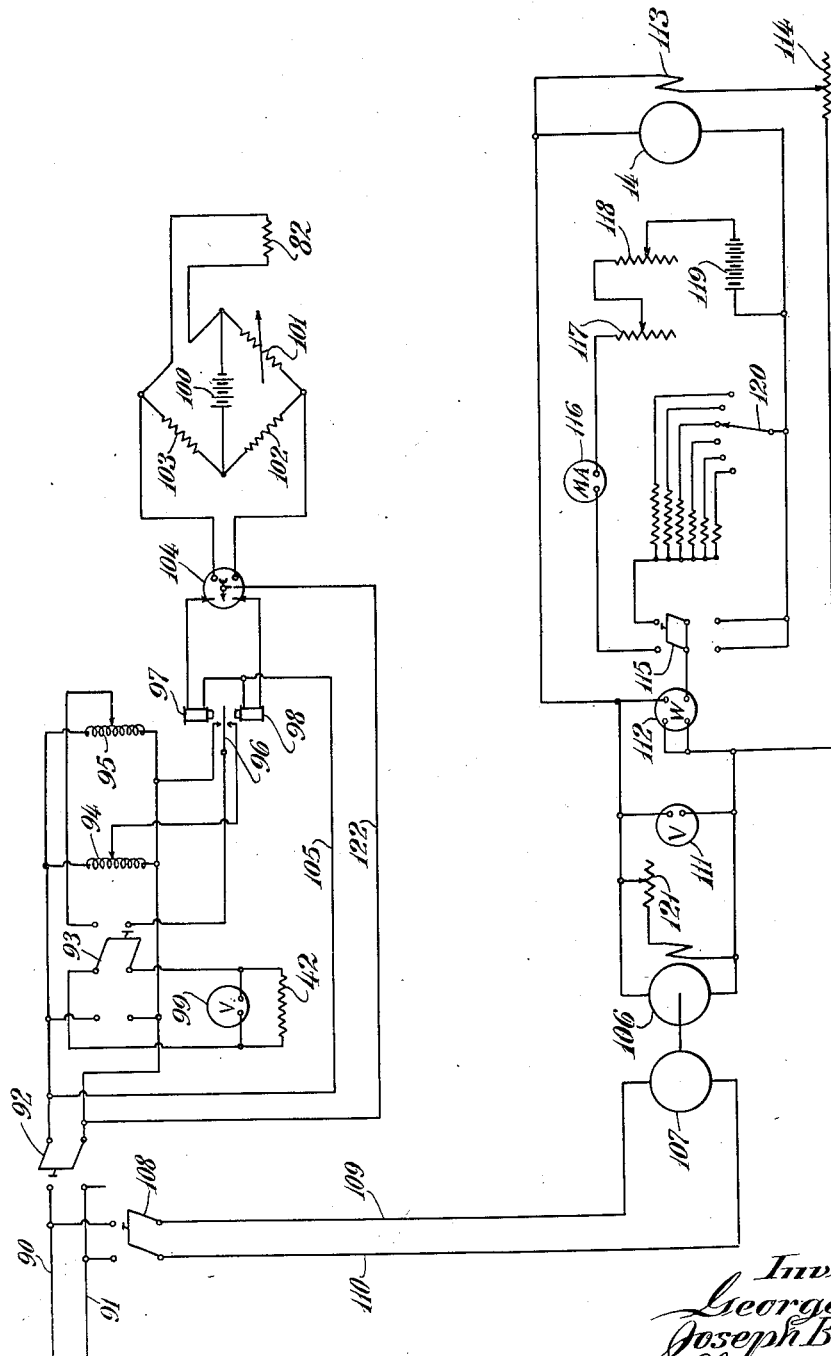
Figure 4 is a diagrammatic representation of electrical apparatus and circuits which can be used according to our invention for control and power measurement purposes.

Suitable electrical apparatus is shown diagrammatically in Figure 4 for controlling the temperature of the sample under test in chamber 35 and the rate of stirring, and for measuring variations in the power consumed by motor 14 during a test. Heating coil 42 is supplied directly with a suitable electrical current, preferably 110-volt 60-cycle alternating current, from conductors 90 and 91 by closing switch 92 when double-pole, double-throw switch 93 is closed to the left. The line voltage is also applied across variable autotransformers 94 and 95 in parallel, and by closing switch 93 in its right hand position the output voltages of these transformers are made avaible for temperature control. This circuit also includes lock-in relay armature 96 actuated by coils 97 and 98, and it is obvious therefrom that when a current flows through coil 97 the voltage supplied by the lower portion of autotransformer 95 is applied to heating coil 42 and will be shown by voltmeter 99, and that when a current flows through coil 98, the voltage applied to heating coil 42 is the difference between the voltages supplied by the lower portions of autotransformers 94 and 95. By suitable adjustment of autotransformers 94 and 95 any desired temperature can be maintained within close limits if relay armature 96 is properly operated in response to temperature variations.

In the present system such variations cause corresponding variations in the resistance of resistance thermometer 82 which is one arm of a Wheatstone bridge circuit composed of battery 100, cablibrated variable resistance 101, resistances 102 and 103, and galvanometer 104, so that the bridge will become unbalanced and the galvanometer needle will be deflected in a direction depending upon the direction of the temperature change of thermometer 82 from the desired value. Coils 97 and 98 are selectively actuated by a simple relay circuit including power lines 105 and 122, according to the direction of deflection of galvanometer 104. It is obvious from the above that this circuit is capable of controlling the temperature in chamber 35 by causing variations in the voltage supplied to coil 42 responsive to resistance thermometer 82.

The current for actuating motor 14 is generated by generator 106, preferably of the shunt-wound, direct-current type as shown, driven by motor 107, which in turn is supplied with alternating current from conductors 90 and 91 by means of switch 108 and lines 109 and 110 respectively. Voltmeter 111, the potential winding of wattmeter 112, and the field coil 113 and rheostat 114 of motor 14 are connected in parallel across the output of generator 106. The current coil of wattmeter 112 and the armature winding of motor 14 are connected to the circuit in series when double-pole, double-throw switch 115 is closed in its lower position so that the line voltage is impressed upon the armature winding. When switch 115 is closed in its upper position, milliammeter 116, adjustable resistances 117 and 118, and battery 119 in series are inserted into the circuit in parallel with an adjustable shunt 120. By means of resistances 117 and 118 in series with battery 119, a potential can be selected that is equal in magnitude and opposite in polarity to that which would otherwise appear across milliammeter 116 due to the flow of current through shunt 120, thus preventing the flow of current through milliammeter 116. This "zero" setting is made at the beginning of each test when motor 14 has no load, and is preferably repeated for each position of shunt 120 to be used during the test, so that there is a known zero setting of resistances 117 and 118 for each setting of shunt 120. Thereafter, when the appropriate zero setting is used milliammeter 116 will read only the increases in armature current due to increased loads on motor 14 because these will increase the potential difference across shunt 120 to a value greater than that provided by battery 119 and resistances 117 and 118. The voltage supplied by generator 106 is controlled by adjustment of field rheostat 121.

The operation of our improved consistometer in the embodiment hereinabove described will be given in connection with the determination of the consistency changes in a cement slurry at a pressure of 2500 pounds per square inch and 175° F.

In starting a test and before introducing the sample into chamber 34, switch 92 is closed and switch 93 is closed to the left, so that the full line voltage across conductors 90 and 91 is applied to heating coil 42. When a temperature within 20° F. of the test temperature of 175° F. has been reached, as indicated by resistance thermometer 82, calibrated resistance 101 and galvanometer 104, switch 93 is thrown to the right thus causing the current to flow through transformer 95, which is adjusted so as to maintain a temperature slightly above 175° F. Resistance 101 is then set at a value such that galvanometer 104 will give a zero indication when thermometer 82 is at 175. F., and the temperature of the apparatus will continue to rise slowly since relay coil 97 will be actuated to close the heater circuit. As explained above transformer 94 is arranged to subtract voltage from that delivered by transformer 95 and is adjusted to reduce the latter by an amount just sufficient to change the temperature maintained to a value slightly below 175° F. When the temperature rises above 175° F., the needle of galvanometer 104 moves down until the circuit including relay coil 98 is closed and that including coil 97 is broken, and relay armature 96 causes transformer 94 to be inserted in the heater circuit, thus reducing the heater voltage as indicated by voltmeter 99 and allowing slow cooling to occur. Obviously this operation is reversed when the temperature falls below 175° F., so that a substantially constant test temperature is maintained.

The closure unit including nipple 36, stirrer 59 and associated apparatus is then lifted out and freshly mixed cement slurry is poured into chamber 35 or added through line 47 and valve 48 in an amount sufficient to cause the cement level to be at the normal level of diaphragm 57 when the apparatus has been reassembled. Gasket 38 is then put in place and the closure returned to position. Coupling 39 is then rotated until a tight seal is obtained, and locked by means of cap screw 41 (Figure 1), lines 30 and 32 are connected by means of coupling 31, and motor 14 and associated parts are lowered by means of cable 19 until the portions of shaft coupling 24 on driving shaft 22 and stirring shaft 23 are in operative position. If desired, further small quantities of cement slurry can be forced into chamber 35 through line 47 and valve 48 to raise diaphragm 57 to a desired position as indicated by pilot light 77 when electrical contact has been made between disc 61 and conductor 62. Normally this procedure is carried out as the pressure is applied, as described below. Changes in the volume of the sample during a test can then be followed easily by further rotation of sheath 65 so that disc 61 and conductor 62 just touch.

In order to impose the desired pressure on the sample, a liquid such as lubricating oil is supplied to chamber 56 by means of pump 29 and lines 30 and 32, air being allowed to escape therefrom through bore 78, line 79 and valve 80. When all of the air in chamber 56 has been replaced by oil, valve 80 is closed, so that the pressure therein builds up to the desired point as indicated on gauge 33, in this case 2500 pounds per square inch, and is imposed on the cement slurry through diaphragm 57. During this operation valve 48 is of course closed. As mentioned above some oil is lost during the test by leakage past the shaft 23, and this is compensated by the addition of sufficient oil from time to time to maintain the test pressure.

The sample is now at the desired temperature and pressure, and the consistency test itself can be begun. Switch 108 (Figure 4) is closed to start motor 107 and direct current generator 106 and the direct current line voltage as read on voltmeter 111 is maintained at a constant value, e. g., 100 volts, by adjustment of generator field resistance 121. Direct current motor 14 is then started and its speed is adjusted to an arbitrary value such as 1200 revolutions per minute as indicated by tachometer 18 (Figure 1) by means of motor field resistance 114. As described above, motor 14 preferably drives shaft 23 and stirrer 50 through a speed reducing gear. In this particular case, a gear ratio of 25.5 to 1 was used, so that the speed of stirrer 50 was about 47 revolutions per minute. Since the field current of a direct-current shunt-wound motor is substantially constant, the power consumed or power changes in the field circuit are not measured but the power required by the armature of motor 14 is measured by commercial wattmeter 112, and in this way the consistencies of different samples can be compared. However, wattmeter 112 is graduated in divisions having a value, e. g., 2 watts, which is too coarse for measuring the changes in power caused by small changes in cement consistencies, so that the sensitive apparatus described above must be used for that purpose.

Consistency readings are taken at fixed intervals of 10 minutes, for example. A reading is made by first adjusting resistance 121 so that voltmeter 111 reads exactly 100 volts. Switch 115 is then changed from its usual lower position to the upper position so that milliammeter 116 and adjustable shunt 120 are in the circuit, shunt 120 is set at the proper resistance value to give the desired sensitivity of milliammeter 116 to current changes, and resistances 117 and 118 are adjusted to the appropriate zero setting. By proper selection of shunt resistance, power changes can be read to 0.002 watt, the voltage of course being constant.

From a knowledge of the full-load and no-load currents, the applied voltage, and the armature resistance, the torque applied to the stirring mechanism can be computed, the results being relative rather than absolute. The preferred method of handling the data obtained is to calibrate the stirring mechanism by running a series of tests under various pressures using liquids of progressively increasing viscosities, and obtaining from these tests a curve of viscosity against difference in full-load and no-load current at the standard conditions used in the normal tests. The data for any actual test, can then be compared with this curve and the viscosity of the substance (cement slurry, drilling mud, etc.) can be determined. Changes in consistency are then indicated by the changes in viscosity. The final expression of the data obtained in a single run is normally a graphical plot of viscosity in poises against time. Obviously the length of time a cement will remain pumpable can be readily estimated from the curve.

When a test is completed, the cement is removed, and the apparatus is thoroughly washed, dried and reassembled for the next test. The cement removed can be subjected to other tests such as tensile or compression strength tests.

From the above it can be seen that we have devised a new and improved consistometer capable of testing the consistencies of fluids at high temperatures and very high pressures.

It is also obvious that this type of apparatus may be used for other purposes than determining consistencies; for example, it may be used for the agitating of non-lubricating fluids at high pressures and at elevated temperatures. While we have described our invention in connection with a specific embodiment thereof, we do not wish to limit ourselves thereto, but only by the scope of the following claims.

We claim:

1. In an apparatus for agitating a fluid at a high pressure in a vessel capable of withstanding high pressures including means within said vessel for agitating a sample of said fluid, and a shaft for driving said agitating means extending through an opening in said vessel, the combination which includes means for supplying a liquid under pressure to a part of said vessel adjacent said opening, and means dividing said vessel into a chamber containing said agitating means and a chamber in communication with said liquid-supply means, said dividing means being adapted to vary the relative sizes of said chambers under the influence of pressure differences therein and having a low-friction opening through which said shaft extends whereby said sample can be agitated at high pressure with minimum danger of loss by leakage.

2. In apparatus for agitating a fluid at a high pressure including a vessel capable of withstanding high pressures, means within said vessel for agitating a sample of said fluid, and a shaft for driving said agitating means extending through an opening in said vessel, the combination which comprises a flexible diaphragm mounted within said vessel between said agitating means and said opening, a packing gland mounted in said diaphragm in operative relationship with said shaft, and means for supplying a liquid under a high pressure to that portion of said vessel between said diaphragm and said opening, whereby said sample is prevented from leaking from said vessel and the friction acting on said driving shaft is kept at a minimum.

3. Apparatus for measuring the consistency of a fluid comprising a chamber capable of withstanding high pressures, a flexible diaphragm disposed within said chamber and dividing the same into upper and lower portions, a packing gland axially mounted in said diaphragm, means for filling said lower portion with said fluid, means within said lower portion for stirring said fluid, means for driving said stirring means including a shaft passing through said packing gland and said upper portion of said chamber, means for measuring the power consumed by said driving means, and means for supplying a liquid under pressure to the upper portion of said chamber.

4. A high pressure consistometer comprising a sample-receiving vessel having an opening at one end thereof, a closure member adapted to close said opening, means for providing a tight seal between said vessel and said closure member, a shaft mounted on and extending through said closure member into said vessel, stirring means mounted on said shaft, a packing gland in operative relationship with said shaft between said stirring means and said closure member, a flexible diaphragm extending between said packing gland and said closure member, means for supplying a fluid under pressure to the space between said diaphragm and said closure member, a prime mover adapted to drive said shaft, and means for determining the power consumed by said prime mover.

5. A high pressure consistometer comprising a sample-receiving vessel open at its upper end and having a valved port at its lower end, a closure member adapted to close said upper end of said vessel, quick-coupling means for providing a tight seal between said vessel and said closure member, a shaft axially mounted on said closure member and adapted to extend therethrough into said vessel when said closure member is in operative position, stirring means mounted on said shaft, a packing gland in operative relationship with said shaft between said stirring means and said closure member, a flexible diaphragm having its outer periphery sealed to said closure member and supporting said packing gland axially of said diaphragm, means for supplying a liquid under a desired high pressure to the space above said diaphragm, valved means for allowing air to escape from said space, means for maintaining said vessel at a desired temperature, an electric motor mounted above said vessel, means for changing the height of said motor, means for coupling said motor and said shaft, and means for determining a function of the power consumed by said motor.

6. A high pressure consistometer according to claim 5 including means for determining the location of said packing gland with respect to said closure member.

JOSEPH BALDWIN CLARK.
GEORGE S. BAYS.